Patented Aug. 31, 1954

2,688,019

UNITED STATES PATENT OFFICE 2,688,019

6-ARYL-2,4-DIAMINO PYRIMIDINES AND PROCESS OF PREPARING SAME

George H. Hitchings, Tuckahoe, Peter Byrom Russell, Crestwood, and Elvira A. Falco, New Rochelle, N. Y., assignors to Burroughs Wellcome & Co. (U. S. A.) Inc., Tuckahoe, N. Y., a corporation of New York No Drawing. Application August 25, 1951, Serial No. 243,758

5 Claims. (Cl. 260—256.4)

The present invention relates to a new group of aminopyrimidines which possess outstanding physiological properties in veterinary medicine and are believed to have application in the treatment of certain human ailments. The derivatives have been discovered also to be active agents for inhibiting the growth and multiplication of certain viruses of the type susceptible to rapid multiplication and growth. This application is a continuation-in-part of our co-pending applications 74,462 and 101,256, now both abandoned. The physiologically active compounds according to the present invention may be graphically illustrated by the formula

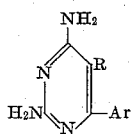

wherein R is selected from the class consisting of alkyl, benzyl and aryloxy radicals containing not over 2 rings and Ar is selected from the class consisting of phenyl and naphthyl.

The compounds of the present invention may be conveniently synthesized by the initial preparation of the corresponding 4-hydroxy derivative by refluxing an alcoholic solution of guanidine carbonate with a selected keto ester until the reaction is complete. This reaction may be represented as follows:

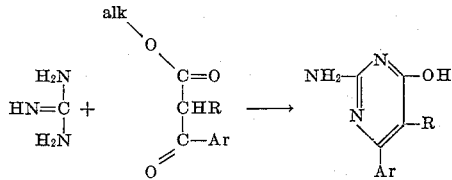

wherein R and Ar are defined as mentioned above. The 4-hydroxy derivative is recovered by aqueous dilution and acidification of the reaction mixture in the usual manner.

The hydroxy aminopyrimidine may then be converted to the corresponding chloro derivative by treatment with excess phosphoryl chloride under reflux conditions. The 4-chloroaminopyrimidine is then reacted with ammonia. For this purpose water, alcohol or mixtures thereof are suitable solvents. The base is usually employed in considerable excess as will be seen from the examples and it is convenient to use a saturated solution of ammonia either in water or in alcohol.

By a somewhat modified but equally convenient procedure the above-mentioned 4-hydroxy aminopyrimidine derivative can be converted into the corresponding 4-sulfhydryl pyrimidine by the method of Hitchings and Elion as disclosed in U. S. Patent No. 2,415,793. This derivative is then transformed into the selected aminopyrimidine by the method of our co-pending applications Serial Nos. 33,677 and 33,678 filed June 17, 1948, now both abandoned, by drastic treatment with ammonia or an amine as follows:

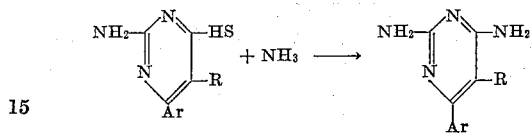

The reaction proceeds smoothly with the replacement of the sulfhydryl group by the amino group by reflux or in a sealed container.

By a further method the compounds may be prepared by the initial formation of a 2-sulfhydryl-4-hydroxy pyrimidine by the reaction of a keto ester with thiourea

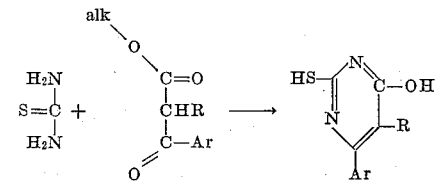

followed by conversion of the hydroxy group into a second sulfhydryl group and the desired aminopyrimidine prepared by the methods of our co-pending applications with ammonia.

The following procedures illustrate specific methods for preparing the new derivatives in accordance with the present invention.

EXAMPLE 1

*2,4-diamino-5-methyl-6-phenylpyrimidine*

Ethyl α-methylbenzoylaceate (10 g.) was refluxed with guanidine carbonate (6 g.) in alcohol (20 ml.) for 5 hours. The mass was diluted with water and then made acid with acetic acid. The crystalline mass was filtered off (5.0 g.). After recrystallization from aqueous ethanol 2-amino-4-hydroxy-5-methyl-6-phenyl pyrimidine melted at 287°.

The above compound (5 g.) was refluxed with phosphorus oxychloride (35 cc.) for 1½ hours. The excess phosphoryl chloride was removed in vacuo and the residue poured onto ice and ammonia. After recrystallization from aqueous ethanol 2-amino-4-chloro-5-methyl-6-phenylpyrimidine formed plates melting at 127–128°.

The chloro compound (2.5 g.) was heated at 130–140° with a 50 cc. saturated solution of alcoholic ammonia for 20 hours. Working up in the usual manner gave the product which on recrystallization from ethanol formed colorless needles having an M. P. of 196–197°.

EXAMPLE 2

*2,4-diamino-5-n-propyl-6-phenylpyrimidine*

Ethyl-α-n-propylbenzoylacetate (47 g.) was refluxed with guanidine carbonate (12 g.) in alcohol (200 cc.) for 6 hours. At the end of this time the mixture was poured into water, made acid with acetic acid and the solid filtered (12 g.). After crystallization from ethanol 2-amino-4-hydroxy-5-n-propyl-6-phenylpyrimidine formed flat needles having an M. P. of 311–313° (decomposed).

The above aminohydroxy compound (10 g.) was refluxed with phosphorus oxychloride (50 cc.) until all was dissolved and then worked up in the usual manner. The above crude chloro compound was dissolved in 100 cc. saturated ethanolic ammonia, heated in a closed system and worked up in the usual manner. The product (3. g.) was recrystallized from aqueous ethanol having an M. P. of 165–166° as needles.

EXAMPLE 2a

By a similar procedure 2,4-diamino-5-n-butyl-6-α-naphthylpyrimidine was prepared.

EXAMPLE 3

*2,4-diamino-5-benzyl-6-phenylpyrimidine*

Ethyl α-benzylbenzoylacetate (40 g.) and guanidine carbonate (12 g.) in alcohol 100 cc. were refluxed for 12 hours. The whole was poured into water. The resulting sticky mass on removal of an oily portion with ether gave 17 gms. of crystalline material. The 2-amino-4-hydroxy-5-benzyl-6-phenylpyrimidine formed colorless plates on recrystallization from ethanol having an M. P. of 334° (decomposed).

The above aminohydroxypyrimidine (15 g.) was refluxed for 1 hour with phosphorus oxychloride (50 cc.). The excess phosphorus oxychloride was removed in vacuo and the residue poured onto ice. After making alkaline with ammonia in the usual manner the solid was filtered and dried. It weighed 10 g.

The chloro compound (10 g.) was heated with saturated alcoholic ammonia (100 cc.) as 130–140° overnight. The alcohol and ammonia were removed and the residue after treatment with 5 N NaOH was recrystallized from aqueous ethanol (6. g.) having an M. P. of 222–223°.

EXAMPLE 3a 2,4-diamino-5-p-chlorobenzyl-6-phenylpyrimidine was prepared by following the above procedure.

EXAMPLE 4

*2,4-diamino-5-methyl-6-p-chlorophenylpyrimidine*

Ethyl α-methyl-p-chlorobenzoylacetate (16 g.) was refluxed with guanidine carbonate (10 g.) in alcohol 30 cc. for 6 hours. The mixture was poured into water acidified with acetic acid and filtered. The solid weighed 13 g. 2-amino-4-hydroxy-5-methyl-6-p-chlorophenylpyrimidine was recrystallized from ethanol water and melted at 331–333°.

The hydroxy pyrimidine (13 g.) was chlorinated in the usual manner giving 14 g. of the crude chloro compound. As in the previous examples this was heated with alcoholic ammonia at 130°. It yielded 8 g. of the product which crystallized from ethanol water as long colorless needles having an M. P. of 184–185°.

EXAMPLE 4a 2,4-diamino-5-n-heptyl-6-p-bromophenylpyrimidine was prepared by exactly the same procedure described above.

The following derivatives showing additional examples of pharmacologically active compounds according to the invention were prepared exactly by the above-described procedures.

EXAMPLE 5

2,4-diamino-5-ethyl-6-β-naphthylpyrimidine.

EXAMPLE 6

2,4-diamino-5-hexyl-6-phenylpyrimidine.

EXAMPLE 7

2,4-diamino-5-(3'-methylhexyl)-6-p-bromophenylpyrimidine.

EXAMPLE 8

2,4-diamino-5-benzyl-6-m-chlorophenylpyrimidine.

EXAMPLE 9

*2,4-diamino-5-(6'-bromo-2'-naphthoxy)-6-phenylpyrimidine*

An alcoholic solution of ethyl α-chloro-β-benzoylacetate was treated with an equimolecular amount of sodium-6-bromo-2-naphtholate under reflux for 30 hours. The mixture was poured into water and the ethyl 6'-bromo-2'-naphthoxy acetoacetate was recovered by extraction with benzene and ether and after drying was purified by distillation. The purified ester was condensed with guanidine carbonate and the 2-amino-4-hydroxy-5-(6'-bromo-2'-naphthoxy)-6-phenylpyrimidine precipitated by the addition of water followed by acidification to a pH of about 6.5. A portion of the product (15 g.) is dissolved in 50 ml. of phosphoryl chloride and refluxed for about ½ hour. The excess phosphoryl chloride is distilled from the product and the reaction mixture chilled in the presence of cracked ice and neutralized to precipitate the 2-amino-4-chloro-5-(6'-bromo-2'-naphthoxy)-6-phenylpyrimidine which was washed with water and dried under vacuum.

The amination of the product is performed by treating 3 g. of the 2-amino-4-chloro-5-(6'-bromo-2'-naphthoxy)-6-phenylpyrimidine with 100 ml. of a saturated ethanolic ammonia solution in a chilled vessel at a temperature of about 150° C. for a period of 16 hours. The product is evaporated to dryness on a steam bath and taken up in 50 ml. of water whereupon the desired diamino derivative is precipitated by the addition of excess saturated sodium hydroxide solution. Purification is performed in aqueous medium by the addition of hydrochloric acid followed by precipitation with sodium hydroxide solution and the pure compound recovered therefrom.

The following additional compounds were prepared according to the foregoing procedure.

EXAMPLE 10

2,4 - diamino-5-p-methoxyphenoxy-6-phenylpyrimidine.

EXAMPLE 11

2,4-diamino-5-p-chlorophenoxy - 6 - phenylpyrimidine

EXAMPLE 12

2,4-diamino-5-p-bromophenoxy - 6 - phenylpyrimidine.

EXAMPLE 13

2,4-diamino-5-$\beta$-naphthoxy - 6 - phenylpyrimidine.

EXAMPLE 14

2,4-diamino-5$\alpha$-naphthoxy - 6 - phenylpyrimidine.

EXAMPLE 15

2,4-diamino - 5 - (2,4-dichloro-$\alpha$-naphthoxy) - 6-phenylpyrimidine.

EXAMPLE 16

2,4-diamino-5-(1-bromo - $\beta$ - naphthoxy)-6-phenylpyrimidine.

EXAMPLE 17

2,4 - diamino-5-p-phenoxyphenoxy-6-phenylpyrimidine.

EXAMPLE 18

2,4-diamino - 5 - $\beta$ - naphthoxy-6-p-chlorophenylpyrimidine.

EXAMPLE 19

2,4-diamino-5-$\alpha$-naphthoxy - 6 - p - bromophenylpyrimidine.

EXAMPLE 20

2,4 - diamino-5-p-chlorophenoxy-6-p-methylphenylpyrimidine.

EXAMPLE 21

*2,4-diamino-5-$\beta$-naphthoxy-6-phenylpyrimidine*

Ethyl $\alpha$-($\beta$-naphthoxy-benzoyllactate (29 g.) was dissolved in ethanol (50 ml.) and refluxed with guanidine carbonate (14 g.) The mixture after 7 hours was poured over ice. The aqueous layer was acidified and then decanted. The residual oil was washed with water, ether and the solid filtered off. This hydroxyamino compound (15 g.) was heated with phosphoryl chloride (70 ml.) until all dissolved. The excess phosphoryl chloride was removed and the residue poured into water. The solid was filtered off and heated with saturated ethanolic ammonia (100 ml. set at 0°) overnight. After removal of the excess EtOH/NH₃ the residue was crystallized from methanol, M. P. 164–165°.

EXAMPLE 22

*2,4-diamino-5-p-chlorophenoxy-6-phenylpyrimidine*

Condensation of ethyl $\alpha$-(p-chlorophenoxy)-benzoylacetate (9.5 g.) with guanidine carbonate (10 g.) in 20 ml. of ethanol gave 2-amino-4-hydroxy - 5 - p - chlorophenoxy-6-phenylpyrimidine. The aminohydroxypyrimidine (7 g.) was chlorinated with phosphorus oxychloride (10 g.) and the chloro compound worked up in the usual manner and heated with saturated ethanolic ammonia (50 ml.). The product worked up in the usual manner formed colorless needles, M. P. 187° (3 g.).

*Anal.*—Calcd. for $C_{16}H_{13}ON_4Cl$: N, 17.9. Found: N, 17.5.

We claim:

1. 2,4 - diamino-5-(6'-bromo-2'-naphthoxy)-6-phenylpyrimidine.
2. 2,4-diamino - 5 - $\beta$ - naphthoxy-6-p-chlorophenylpyrimidine.
3. A method of forming compounds having the formula

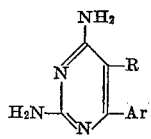

wherein R is selected from the class consisting of alkyl, benzyl and aryloxy radicals containing not over two rings and Ar is selected from the class consisting of phenyl and naphthyl, which comprises reacting a keto ester having the formula

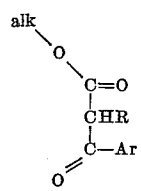

wherein R and Ar have the above mentioned values with guanidine to form the 4-hydroxy derivative, reacting the latter compound with excess phosphoryl chloride and then reacting the resulting 4-chloropyrimidine with ammonia to form the desired compound.

4. A method of forming compounds having the formula

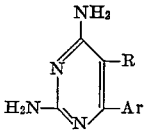

wherein R is selected from the class consisting of alkyl, benzyl and aryloxy radicals containing not over two rings and Ar is selected from the class consisting of phenyl and naphthyl, which comprises reacting a keto ester having the formula

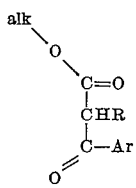

wherein R and Ar have the above mentioned values with guanidine to form the 4-hydroxy derivative.

5. The process set forth in claim 4 wherein the keto ester is refluxed with an alcoholic solution of guanidine carbonate to form the 4-hydroxy derivative.

References Cited in the file of this patent

UNITED STATES PATENTS

| Number | Name | Date |
|---|---|---|
| 2,211,710 | Zerweck et al. | Aug. 13, 1940 |

OTHER REFERENCES

Falco et al., British Journal of Pharmacology and Chemotherapy 6 185–200 (1951).